April 14, 1936.  A. BARÉNYI  2,037,360
SHUTTER FOR PHOTOGRAPHIC CAMERAS
Filed Jan. 14, 1935  2 Sheets-Sheet 1
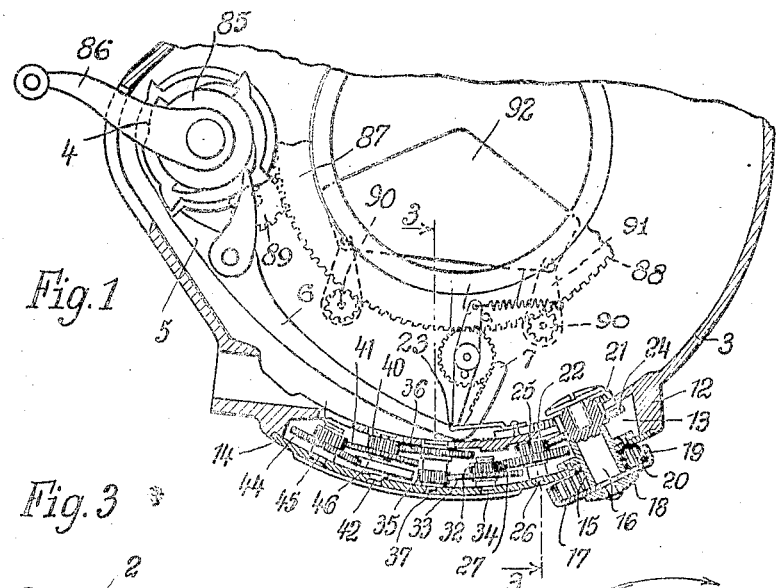
Fig.1
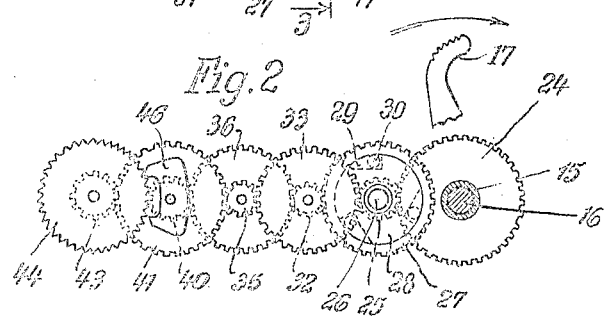
Fig.3
Fig.2
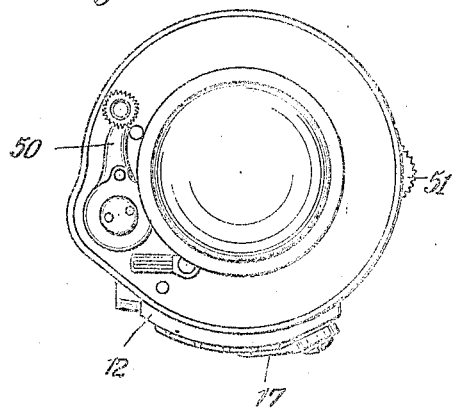
Fig.5
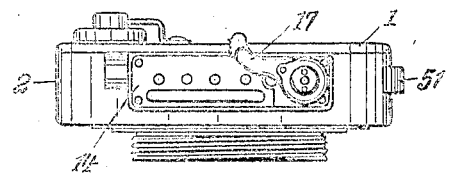
Fig.4
INVENTOR
Arpád Barényi
BY
ATTORNEY April 14, 1936.  A. BARÉNYI  2,037,360
SHUTTER FOR PHOTOGRAPHIC CAMERAS
Filed Jan. 14, 1935  2 Sheets-Sheet 2
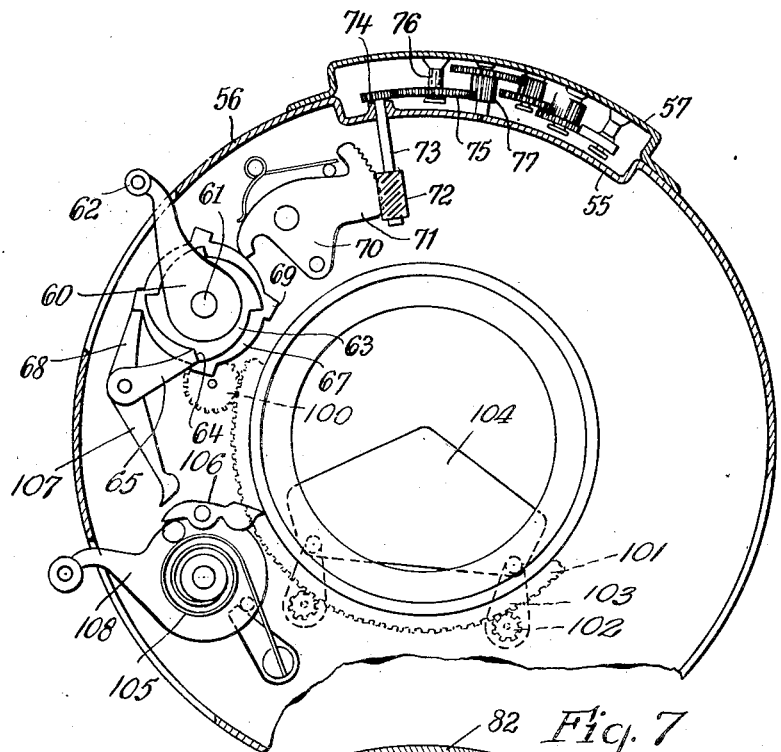
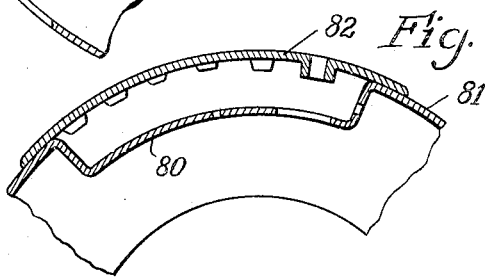
INVENTOR
Árpád Barényi
By
Frank Reinhold
ATTORNEY Patented Apr. 14, 1936

2,037,360

UNITED STATES PATENT OFFICE 2,037,360

SHUTTER FOR PHOTOGRAPHIC CAMERAS

Árpád Barényi, Berlin-Lichterfelde, Germany, assignor to Voigtländer & Sohn Aktiengesellschaft, Brunswick, Germany, a joint-stock company of Germany Application January 14, 1935, Serial No. 1,730
In Germany January 24, 1934

3 Claims. (Cl. 95—63)

My invention relates to improvements in shutters for photographic cameras, and more particularly in shutters of the type comprising retarding mechanism adapted to control the operation of the shutter mechanism. For example, the said retarding mechanism may cooperate with a motor or master member for timing instantaneous exposures, or it may cooperate with a motor-releasing detent for releasing the motor only after a certain period of time. The object of the improvements is to construct the retarding mechanism so that it requires little space. The retarding mechanism includes a gear train, and my invention consists in assembling the gear train in approximation to a cylindrical surface concentrically arranged with respect to the shutter casing, and preferably close to the circumferential wall of the said casing, and with its gear wheels perpendicular to the planes of the end walls of the shutter casing. A retarding mechanism thus constructed requires little space radially of the shutter casing and particularly when it is mounted close to and concentrically of the circumferential wall of the casing, so that it does not interfere with the mounting of other parts of the shutter mechanism.

For the purpose of explaining the invention several examples embodying the same have been shown in the accompanying drawings in which the same reference characters have been used in all the views to indicate corresponding parts. In said drawings, Fig. 1 is a fragmentary sectional elevation showing a part of the shutter casing and of the shutter mechanism, and a retarding mechanism cooperating with the motor-releasing detent, Fig. 2 is a bottom view of Fig. 1, the lid closing the housing of the delay action or retarding mechanism being removed, Fig. 3 is a sectional elevation taken on the line 3—3 of Fig. 1, Fig. 4 is a bottom view of Fig. 1, Fig. 5 is an end view of the shutter viewed from the side of the object, Fig. 6 is a sectional elevation similar to the one illustrated in Fig. 1 and showing the retarding mechanism cooperating with the motor or master member for regulating the time of exposure, Fig. 7 is a sectional elevation showing a modification of the housing enclosing the delay action or retarding mechanism, and Fig. 8 is a sectional elevation showing one of the gear wheels bent into spherical shape.

In the figures I have shown fragmentarily a casing that will be recognized to be the casing of a pivoted-blade, symmetrical opening shutter comprising a blade mechanism and a spring driven motor or master member which when set and released rotates the blades in the same direction for opening and closing the shutter.

In the example shown in Figs. 1 to 5, the annular casing (within which, as will be understood, the shutter members themselves are mounted) comprises the usual plane end plates 1 a partition member 2, and a cylindrical circumferential wall 3. The invention does not relate to the construction of the main parts of the shutter mechanism, and therefore I deem it not necessary to show all these parts in the figure, the figure showing only so much of the shutter mechanism as is necessary for illustrating the cooperation with the retarding mechanism.

Within said casing and on the partition member 2 a motor or master member 4 of any known or preferred construction is mounted, which is connected with the shutter blades in the manner known in the art. The housing of the motor or master member is engaged by a detent 5 adapted to hold the member 4 against rotation and, when swung aside, to release the member 4 and to permit it to respond to rotative impulse. The detent 5 is formed with a rear extension 6 having a toothed portion 7 in mesh with a pinion 8 rotatably mounted on the partition member 2. The said pinion is connected with a lever 9 having one arm acted upon by a spring 10 tending to turn the pinion 8 clockwise and normally bearing on a pin 11. The said pinion and detent are adapted to be operated for releasing the motor or master member by means of a spring, operation being delayed by means of a retarding mechanism.

In addition to the parts described, Fig. 1 shows the usual spring housing 85 and its setting lever 86, a ring 87 rotatably mounted concentrically of the shutter casing and formed with gear teeth 88, a pinion 89 in driving engagement with the usual gear wheel of the spring housing, pinions 90 in mesh with the tooth ring 87, crank arms 91 fixed to the pinions 90, and blades 92 (of which one only is shown), each carried by two such crank arms 91.

The spring housing is put under tension by means of the setting lever 86, and it is locked in tension position by means of the release lever 5, 6. When the release lever is operated, by means of the retarding mechanism shown, rotary movement is imparted to the ring 87, and such movement is transmitted through the pinions 90 and the crank arms 91 to the blades 92.

At its bottom side the circumferential wall 3 is formed with a ridge 12 forming a substantially rectangular chamber 13 and carrying a lid 14 formed concentrically of the circumferential wall 3. Secured to and passed through a bore of the said lid 14 is a sleeve 15 providing a bearing for an arbor 16 having a setting lever 17 secured thereto by means of a nut 18, the said setting lever being formed with a flange 19 providing a housing for a coiled spring 20 fixed with one end to the sleeve 15 and with its opposite end to the flange 19. At its inner end the arbor 16 is formed with teeth 21 meshing with a rack 22 suitably guided on the circumferential wall 3 and carrying a hook-shaped leaf spring 23 engaging the downwardly directed arm of the lever 9.

On the toothed portion 21 of the arbor 16 a gear wheel 24 is mounted which is in mesh with a pinion 25 loosely mounted on a pivot bolt 26 secured to the lid 14. On an extension of the hub of the said pinion a gear wheel 27 is loosely mounted which is formed at its bottom side with a concentric recess, and within the said recess a disk 28 is located which is fixed to the extension of the hub of the pinion 25. As is shown in Fig. 2, the disk 28 is formed with three cut-out portions 29 each formed with a substantially radial wall and a tangential wall, and within the said cut-out portions circular disks or balls 30 are loosely located.

The gear wheel 27 is in mesh with a pinion 32 connected with a gear wheel 33 and mounted on a pivot bolt 34 secured to the lid 14. The gear wheel 33 is in mesh with a pinion 35 connected with a gear wheel 36 and mounted on a pivot bolt 37 fixed to the lid 14. The gear wheel 36 is in mesh with a pinion 40 connected with a gear wheel 41 and loosely mounted on a pivot bolt 42 secured to the lid 14. The gear wheel 41 is in mesh with a pinion 43 connected with an escape-wheel 44 and mounted on a pivot bolt 45 secured to the lid 14, and the said escape-wheel is in engagement with an escapement anchor 46 mounted on the pivot bolt 42.

All the parts of the retarding mechanism are mounted on the lid 14, so that they may be readily assembled thereon before the said lid is fixed to the casing 2, 3. It will be understood that the radial dimensions of the mechanism have been shown exaggerated for the purpose of illustration, and that as a matter of fact the said radial dimensions and that of the housing 12, 14 are but a few millimeters. In order to reduce the said radial dimensions the ends of the pivot bolts 26, 34, 37, 42 and 45 project through holes made in the circumferential wall 3. It will be understood that, while the retarding mechanism does not take any part of the space within the shutter casing, yet it projects but slightly from the circumferential wall 3.

The operation of the retarding mechanism is as follows:

In the position of the parts shown in Fig. 1 the motor or master member 4 has been set and its housing is locked in position by the detent 5. The retarding mechanism has been set by means of the lever 17 which is now in the position shown in Fig. 2, and in the said position the hook-shaped leaf spring 23 engages the arm 9. If now the lever 17 is released it is returned into initial position by the spring 20, and thereby the arbor 16 is turned in a direction for shifting the rack 22 and the spring 23 to the right. Thereby the pinion 8 is rotated anti-clockwise and the detent 5 is slowly carried along in a direction for releasing the housing of the motor or master member 4 to permit the operation of the shutter mechanism. However, such movement of the detent 5 is retarded by the delay action mechanism, the gear wheel 24 and the pinion 25 turning the disk 28 in clockwise direction (as viewed in Fig. 2), so that the balls 30 couple the disk 28 with the gear wheel 27 and the train of gear wheels connected therewith. Therefore, the operator may bring himself into the field of view before the detent 5, 6 has been moved so far that the motor or master member is released. At the end of the movement of the rack 22 the hook-shaped spring 23 releases the lever 9, whereupon the arm 9 and the detent 5 are returned by the spring 10 into position for locking the motor or master member at the end of the rotary movement of the housing thereof.

For making another exposure the setting lever 17 is again turned into the position shown in Fig. 2. Thereby the rack 22 is shifted to the left and the hook-shaped leaf spring 23 engages again the arm 9. Such movement of the setting lever is not transmitted to the train of gear wheels, because now the disk 28 is rotated anti-clockwise so that the balls 30 do not couple the said disk and the gear wheel 27.

From the foregoing description and the figures it appears that the retarding mechanism and its housing are disposed in cylindrical assembly, concentrically of the shutter casing and the lens opening, and the axes of the gear wheels are radial to the said lens opening. Fig. 4 shows that the housing 19 of the delay action mechanism projects but slightly from the circumferential wall of the shutter casing and not much more than the bulged portion of the shutter casing accommodating the motor or master member and its setting lever 50 and a member 51 connected with the mechanism for varying the time of exposure. Fig. 5 shows that the housing of the delay action mechanism does not project beyond the shutter casing in axial direction, and the setting lever 17 projects from the front side of the shutter casing only so far as is necessary for convenient operation.

In Fig. 6, I have shown a modification in which the housing of the retarding mechanism is partly located within the shutter casing, the said housing being provided by an inwardly pressed concentric portion 55 of the circumferential wall 56 of the shutter casing and a cap 57 fixed to the circumferential wall 56. It will be understood that in this construction the housing projects from the circumferential wall of the shutter casing even less than the housing shown in Figs. 1 to 5.

The construction of the retarding mechanism located within the housing 55, 57 may be the same as that of the mechanism shown in Fig. 1. But as shown the said mechanism is used for retarding the turning of the shutter-operating motor. The said retarding mechanism may have the construction shown and described in the patent of the U. S. No. 1,843,265 granted to me February 2, 1932. In Fig. 6, I have shown only so much of the said mechanism as is needed for understanding the manner of mounting the same within the housing and connecting the same with the shutter operating mechanism.

The shutter operating mechanism comprises a motor or master member 60 the arbor 61 of which carries a setting lever 62 and a disk 63 formed with shoulders 64 engaged by a latch 65. To the housing of the motor or master member a disk 67 is secured which cooperates with a release detent 68. In the path of lugs 69 of the disk 67 there is a lever 70 which is made integral with a toothed segment 71 meshing with a worm 72 mounted on a shaft 73. To the said shaft a pinion 74 is secured which is in mesh with a gear wheel 75 secured to an arbor 76. The gear wheel 75 is in mesh with a pinion 77, and the said pinion is connected with a train of gear wheels similar in construction to the train of gear wheels shown in Figs. 1 to 5. It is manifest that, the motor 60 being otherwise released for rotation, its rotation may be retarded by the slow turning of lever 70, and that slow turning of lever 70 may be effected precisely as in Fig. 1 the slow shifting of rack 22 is effected, by a spring that simultaneously rotates the worm 72 and drives the gear train with its escapement arbor.

In Fig. 6 the shutter-operating mechanism comprises a pinion 100, connected with the usual gear wheel of the spring housing, and meshing with a ring 101 mounted concentrically of the shutter casing and formed with gear teeth meshing with pinions 102. The pinions 102 are connected with cranks 103 that carry the shutter blades 104 (of which one only is shown).

The latch 68 is adapted to be released by means of a release lever 108 which is acted upon by spring 105, and which carries a pawl 106 adapted to engage a rear extension 107 of the latch 68. When the release lever 108 is turned counter-clockwise, the spring 105 is put under tension and the pawl 106 slides past the rear extension 107, and, when the release lever 108 is set free, it is turned clockwise by the spring 105, the pawl 106 engaging the rear extension 107, and thus retracting the latch 68 of the spring housing.

In Fig. 7, I have shown another modification in which the housing of the delay action or retarding mechanism is entirely located within the shutter casing, the portion 80 of the circumferential wall 81 of the shutter casing being depressed to a greater depth than the portion 55 shown in Fig. 6. The housing thus provided is closed by a concentric plate or lid 82 on which the delay action or retarding mechanism is mounted, as has been described above.

While in the mechanisms described herein the engagement of the gear wheels is not absolutely regular, in so far as the axes of the interengaging gear wheels are disposed at small angles relatively to one another, I have found that ordinarily this inaccuracy does not interfere with the operation, because the said angle is exceedingly small, so that it is not necessary to provide bevel gear wheels. But if it is desired to provide bevel gear wheels, I prefer to manufacture the same in the manner illustrated in Fig. 8. A plane circular disk 85 is made with spur gears, and thereafter it is pressed into the spherical form shown in the said figure.

I claim:
1. In a shutter structure for photographic cameras, and in combination with a casing of substantially annular shape, having plane end walls and a cylindrical side wall and formed with a lens opening, a rotatable member adapted to serve as blade-operating mechanism, and a latch adapted to be swung from a position of engagement with such rotatable member to a position of release, means for swinging said latch, and a retarding mechanism driven also by said latch-swinging means and including a train of gears and an escapement anchor controlling the turning thereof, said gear train being arranged in cylindrical formation at the periphery of said annular casing, leaving the space within the casing unincumbered and available for the usual placement of the shutter parts.

2. A shutter mechanism as claimed in claim 1, in which the cylindrical wall of the casing is formed with a depression providing a concentric chamber and with a lid closing said chamber, and in which the said gear train is arranged within said chamber.

3. A shutter mechanism as claimed in claim 1, in which the said gear wheels are spherical in shape and formed with beveled teeth.

ÁRPÁD BARÉNYI.